United States Patent

[11] 3,555,310

[72] Inventor Jochen Haeusler
    Furth, Germany
[21] Appl. No. 767,127
[22] Filed Oct. 14, 1968
[45] Patented Jan. 12, 1971
[73] Assignee Siemens Aktiengesellschaft
    Berlin and Munich, Germany
    a corporation of Germany
[32] Priority Oct. 24, 1967
[33] Germany
[31] No. S112573

[54] APPARATUS AND METHOD FOR REDUCING THE INVERSE EFFECT OF A HALL GENERATOR
    8 Claims, 4 Drawing Figs.
[52] U.S. Cl..................................................... 307/309,
                                                             338/32
[51] Int. Cl..................................................... H01v 5/00

[50] Field of Search............................................ 307/309;
                                                             324/45; 338/32

[56] References Cited
UNITED STATES PATENTS
3,406,332  10/1968  Hieronymus..................  307/309

Primary Examiner—Donald D. Forrer
Assistant Examiner—Harold A. Dixon
Attorneys—Curt M. Avery, Arthur E. Wilfond, Herbert L. Lerner and Daniel J. Tick ABSTRACT: The functions of the two pairs of electrodes of a Hall generator are interchanged simultaneously with the reversal of the direction of polarization of the magnetic field acting on the Hall generator to reduce the inverse effect of the Hall generator during reversal of the direction of polarization of the magnetic field.

ary of greater than 10⁻⁴...

APPARATUS AND METHOD FOR REDUCING THE INVERSE EFFECT OF A HALL GENERATOR

DESCRIPTION OF THE INVENTION

The present invention relates to the inverse effect of a Hall generator. More particularly, the invention relates to apparatus and a method for reducing the inverse effect of a Hall generator during reversal of the direction of polarization of a magnetic field acting on the Hall generator.

In order to measure and regulate magnetic fields at an accuracy of greater than $10^{-4}$ in general and, more specifically, to detect fields in nuclear research and in methods of measurement which utilize core spinning resonances in magnetic fields, it is necessary that the direction of polarization of the magnetic fields be reversed with the highest accuracy. The reversal of the direction of polarization of the magnetic fields is in accordance with a predetermined induction value B+ of opposite polarity. The required high accuracy cannot be attained in current-controlled apparatus because of magnetic core hysteresis. Errors due to the reversal of the direction of polarization of a magnetic field occur in known circuits even in apparatus controlled by magnetic fields and including Hall generators as the pilot signal transmitters. The errors due to reversal of the direction of polarization of the magnetic field have, in a control range of 2 to 14 kilogauss, for example, an order of magnitude of approximately $10^{-3}$. These errors are due to different sensitivities of the Hall generator in positive and negative magnetic fields. It is thus necessary to provide a calibrating scale to set the datum or reference value in both directions of the magnetic field.

The functions of the input or control current electrodes and the output or Hall voltage electrodes of a Hall generator are well known, especially when a Hall generator is utilized as a magnetic field responsive device in a known circuit. Thus, for example, the German periodical "Kerntechnik" or "Core Technology" of June 1964, pages 141 to 145, describes a field-controlled magnetic current supply utilizing silicon thyristors. In the described device, the Hall voltage for both directions of the magnetic field is derived from the same pair of electrodes. This causes a difference in sensitivity of the Hall generator in positive and negative magnetic fields and an error results from reversal of the direction of polarization of the magnetic field. The error may be reduced if two Hall generators, each having the same error due to reversal of the direction of polarization of the magnetic field, but in opposite directions, are utilized to indicate the magnetic field. This is, however, very difficult in realization, due to the considerable difficulty in selecting matched pairs of Hall generators. If resistivity is to be utilized to balance the sensitivity of the Hall generators, intricate experimental trail methods are required.

The principal object of the present invention is to provide new and improved apparatus for reducing the inverse effect of a Hall generator.

An object of the present invention is to provide a new and improved method for reducing the inverse effect of a Hall generator.

An object of the present invention is to considerably reduce the inverse effect of a Hall generator.

An object of the present invention is to reduce the inverse effect of a Hall generator without encountering the difficulties of the prior art.

An object of the present invention is to reduce the reverse effect of a Hall generator without the need for experimental trial methods.

An object of the present invention is to provide apparatus for reducing the inverse effect of a Hall generator of any desired geometrical configuration, any zero point voltage, which may be asymmetrical, and which may have different sensitivities in opposite directions of the magnetic field.

Still another object of the present invention is to provide apparatus and a method for reducing the inverse effect of a Hall generator with efficiency, effectiveness, reliability and precision.

In accordance with the present invention, apparatus for reducing the inverse effect of a Hall generator during reversal of the direction of polarization of a magnetic field acting on the Hall generator, the Hall generator having two pairs of electrodes, each pair of electrodes having a different function, comprises a switch connected to the two pairs of electrodes for interchanging the function of the pairs of electrodes simultaneously with the reversal of the direction of polarization of the magnetic field. The switch may comprise a mechanical switch.

The apparatus further comprises a polarity reversal switch for reversing the direction of polarization of the magnetic field. An input circuit supplies a control current. An output circuit provides a Hall voltage. One of the pairs of electrodes comprise control current electrodes and the other of the pairs of electrodes comprise Hall voltage electrodes. The switch is coupled to the polarity reversal switch and connects one pair of electrodes to the input circuit and the other pair of electrodes to the output circuit in one condition of the switch. The switch connects the one pair of electrodes to the output circuit and the other pair of electrodes to the input circuit in another condition of the switch.

The Hall generator may comprise a semiconductor layer of 90° rotary symmetry. The semiconductor layer may be of crossed configuration having equal edge lengths. The polarity reversal switch may comprise a mechanical switch mechanically coupled to the switch.

In accordance with the present invention, a method for reducing the inverse effect of a Hall generator during reversal of the direction of polarization of a magnetic field acting on the Hall generator, the Hall generator having two pairs of electrodes, each pair of electrodes having a different function, comprises interchanging the functions of the pairs of electrodes simultaneously with the reversal of the direction of polarization of the magnetic field. The method comprises normally connecting the control current electrodes of the Hall generator to an input control current supply circuit and the Hall voltage electrodes of the Hall generator to an output Hall voltage providing circuit and switching the control current electrodes of the Hall generator to the output circuit and the Hall voltage electrodes to the input circuit simultaneously with the reversal of the direction of polarization of the magnetic field.

The reduction of the inverse effect of a Hall generator is based on the face that even at more pronounced asymmetries, the no-load characteristic of the Hall generator during normal operation is identical with the no-load characteristic during inverse operation, as indicated by the curve of the magnetic induction B versus the Hall voltage $U_H$. In accordance with the present invention, the inverse operation is adjusted simultaneously with the reversal of the direction of polarization of the magnetic field applied to the Hall generator.

In order that the present invention may be readily carried into effect, it will now be described with reference to the accompanying drawings, wherein.

In the FIGS., The same components are identified by same reference numerals.

Figure 1:
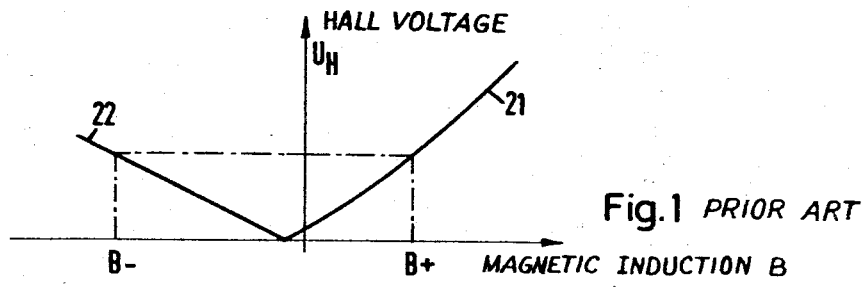
FIG. 1 is a graphical presentation of the magnetic induction versus Hall voltage characteristic of a Hall generator during both directions of polarization of a magnetic field acting on said Hall generator.

In FIG. 1, the abscissa represents the magnetic induction B and the ordinate represents the Hall voltage $U_H$. The Hall voltage $U_H$ varies in accordance with the magnitude and direction of the magnetic induction B for both directions of a control current $i_s$ supplied to the control current electrodes of a Hall generator. In order to clearly illustrate the error due to reversal of the direction of polarization of the magnetic field acting on the Hall generator, each error being less than 1 percent in a conventional Hall generator at a magnetic induction of 10 kilogauss, the characteristic is sharply distorted in FIG. 1.

In FIG. 1, curve 21 indicates the Hall voltage $U_H$ at a positive magnetic induction with a control current $i_s$ supplied to the control current electrodes of the Hall generator. The curve 22 of FIG. 1 indicates the Hall voltage $U_H$ at a negative magnetic induction, which is due to the reversal of the direction of polarization of the magnetic field acting on the Hall generator, and with an opposite control current $-i_s$ supplied to the control current electrodes of the Hall generator.

FIG. 1 illustrates the fact that for a specific Hall voltage $U_H$, the positive magnetic induction B+ is not equal to the negative magnetic induction B−. It is thus concluded from FIG. 1, that a simple reversal of the polarity of the control current supplied to the control current electrodes of the Hall generator upon reversal of the direction of polarization of the magnetic field acting on the Hall generator, results in an inverse effect on the Hall generator relative to the Hall voltage.

Figure 2:
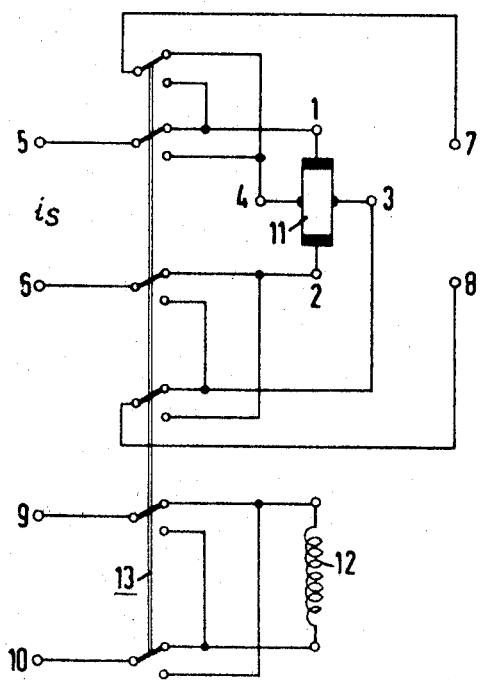
FIG. 2 is a circuit diagram of an embodiment of the apparatus of the present invention for reducing the inverse effect of a Hall generator during reversal of the direction of polarization of a magnetic field acting on said Hall generator.

The apparatus of FIG. 2 is utilized to perform the method of the present invention and is an embodiment of the apparatus of the present invention. In FIG. 2, a Hall generator 11 has two pairs of electrodes 1,2 and 3,4. Each pair 1,2 and 3,4 of electrodes have a different function. An electromagnetic winding 12 is connected to a pair of input terminals 9 and 10 via a polarity reversal switch 13 for reversing the direction of polarization of the magnetic field produced by said winding and acting on the Hall generator 11.

A control current $i_s$ is supplied to the Hall generator via an input circuit connected to terminals 5 and 6 and the Hall voltage is provided at an output circuit connected to output terminals 7 and 8. The winding 12 is energized by current supplied via the input terminals 9 and 10 and the polarity reversal switch 13. An additional switch is mechanically coupled to and extends from the polarity reversal switch 13 and is connected between the input terminals 5 and 6 and the pairs of electrodes 1,2 and 3,4 of the Hall generator 11.

In the condition or position of the polarity reversal switch 13 illustrated in FIG. 2, the control current $i_s$ is supplied to the control current electrodes 1 and 2 of the Hall generator 11 via the input terminals 5 and 6 and the switch extending from said polarity reversal switch, and the output terminals 7 and 8 are connected via said extending switch to the Hall voltage electrodes 3 and 4 of said Hall generator and provide the Hall voltage $U_H$. The position or condition of the polarity reversal switch 13 determines the direction of the energization current supplied to the winding 12 and therefore determines the direction of polarization of the magnetic field acting on the Hall generator 11.

When the polarity reversal switch 13 is moved to its condition or position opposite that illustrated in FIG. 2, the extending switch is moved with it to its opposite position or condition simultaneously. Thus, upon reversal of the direction of polarization of the magnetic field due to the opposite position of the polarity reversal switch 13, the electrodes 1,2 are interchangeably connected with the electrodes 3,4. That is, the pair of electrodes 1 and 2 are connected via the extending switch to the output terminals 7 and 8 and the pair of electrodes 3 and 4 are connected to the input terminals 5 and 6 via said extending switch. The pairs of electrodes 1,2 and 3,4 are thus interchanged in function, so that the electrodes 1 and 2 then function as Hall voltage electrodes and the electrodes 3 and 4 function as control current electrodes.

Figure 3:
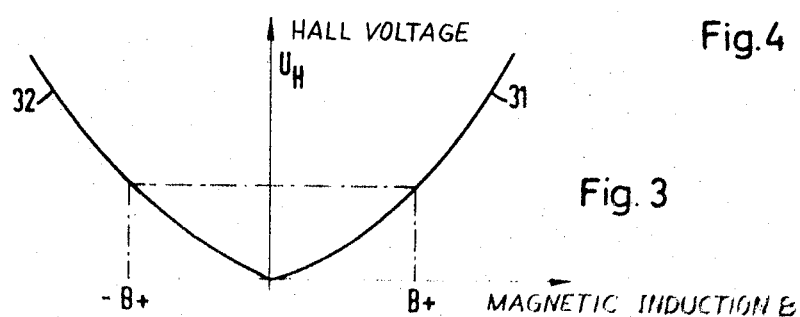
FIG. 3 is a graphical presentation of the magnetic induction versus Hall voltage of a Hall generator provided by the apparatus and method of the present invention.

FIG. 3 illustrates the Hall voltage characteristic of a Hall generator provided by the method of the present invention. The abscissa of FIG. 3 represents the magnetic induction B and the ordinate represents the Hall voltage $U_H$. The curve 31 of FIG. 3 indicates the Hall voltage $U_H$ at a positive direction of polarization of the magnetic field acting on the Hall generator 11, corresponding to one position of the switch 13 of FIG. 2. The curve 32 of FIG. 3 indicates the Hall voltage $U_H$ at a negative direction of polarization of the magnetic field acting on the Hall generator 11, corresponding to the position of the switch 13 opposite that shown in FIG. 2.

The symmetry of the characteristics 31 and 32 of FIG. 3 is clearly evident. The lower the thermal stress of the Hall generator, the better the symmetry of the characteristics. Since the local thermal stress of the Hall generator may vary during normal and inverse operation, it is preferred to reduce the error caused by reversal of the direction of polarization of the magnetic field by utilizing Hall generators which are symmetrical in geometric configuration relative to their input and output sides. At low control currents, the error due to reversal of the direction field is considerably reduced regardless of the geometrical configuration of the Hall generator.

Figure 4:
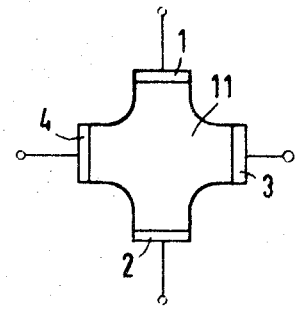
FIG. 4 is a schematic diagram of an embodiment of a Hall generator of cross configuration.

FIG. 4 discloses a Hall generator which comprises a semiconductor layer of 90° rotary symmetry. The semiconductor layer of the Hall generator 11 of FIG. 4 is of cross configuration and has equal edge lengths.

While the invention has been described by means of a specific example and in a specific embodiment, I do not wish to be limited thereto, for obvious modifications will occur to those skilled in the art without departing from the spirit and scope of the invention.

I claim:

1. Apparatus for reducing the inverse effect of a Hall generator during reversal of the direction of polarization of a magnetic field acting on said Hall generator, said Hall generator having two pairs of electrodes, each pair of electrodes having a different function, said apparatus comprising switching means connected to said two pairs of electrodes for interchanging the functions of said pairs of electrodes simultaneously with the reversal of the direction of polarization of said magnetic field.

2. Apparatus as claimed in claim 1, wherein said switching means comprises a mechanical switch.

3. Apparatus as claimed in claim 1, further comprising polarity reversal means for reversing the direction of polarization of said magnetic field, input circuit means for supplying a control current and output circuit means for providing a Hall voltage, and wherein one of said pairs of electrodes comprise control current electrodes and the other of said pairs of electrodes comprise Hall voltage electrodes, and said switching means is coupled to said polarity reversal means and connects said one pair of electrodes to said input circuit means and said other pair of electrodes to said output circuit means in one condition of said switching means and connects said one pair of electrodes to said output circuit means and said other pair of electrodes to said input circuit means in another condition of said switching means.

4. Apparatus as claimed in claim 1, wherein said Hall generator comprises a semiconductor layer of 90° rotary symmetry.

5. Apparatus as claimed in claim 3, wherein said switching means comprises a mechanical switch, said polarity reversal means comprises a mechanical switch mechanically coupled to said switching means and said Hall generator comprises a semiconductor layer of 90° rotary symmetry.

6. Apparatus as claimed in claim 4, wherein said semiconductor layer is of cross configuration having equal edge lengths.

7. A method for reducing the inverse effect of a Hall generator during reversal of the direction of polarization of a magnetic field acting on said Hall generator, said Hall generator having two pairs of electrodes, each pair of electrodes having a different function, said method comprising interchanging the functions of the pairs of electrodes simultaneously with the reversal of the direction of polarization of the magnetic field.

8. A method as claimed in claim 7, wherein said method comprises normally connecting the control current electrodes of said Hall generator to an input control current supply circuit and the Hall voltage electrodes of said Hall generator to an output Hall voltage providing circuit and switching the control current electrodes of said Hall generator to the output circuit and the Hall voltage electrodes to the input circuit simultaneously with the reversal of the direction of polarization of the magnetic field.